March 3, 1953  E. H. SMITH  2,630,357
PACKING ELEMENT WITH RIGID MOUNTING AND REINFORCING MEMBER
Filed March 22, 1950
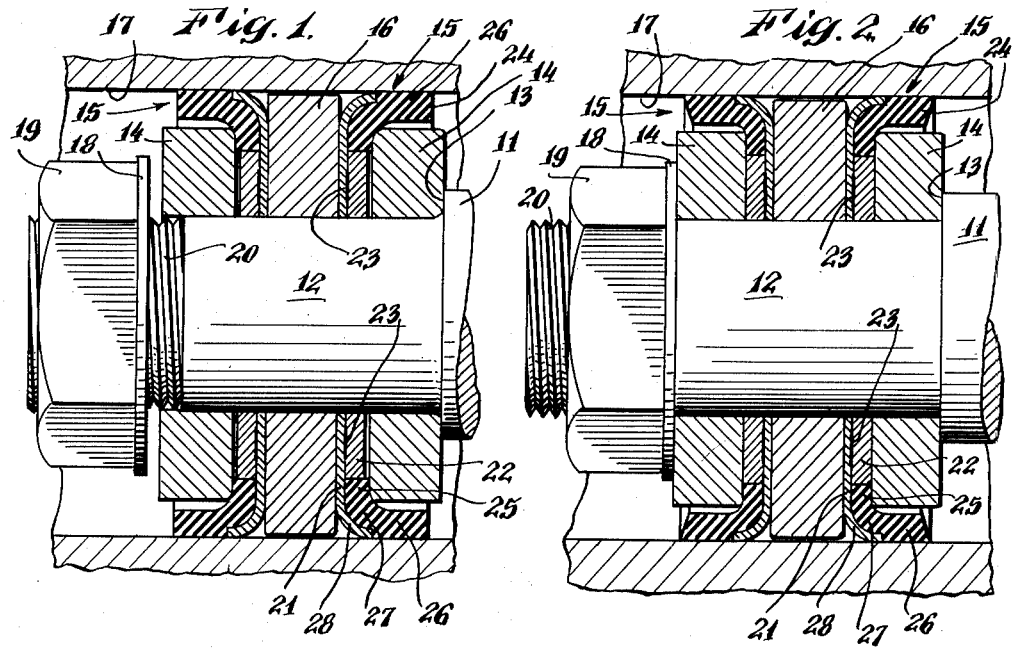
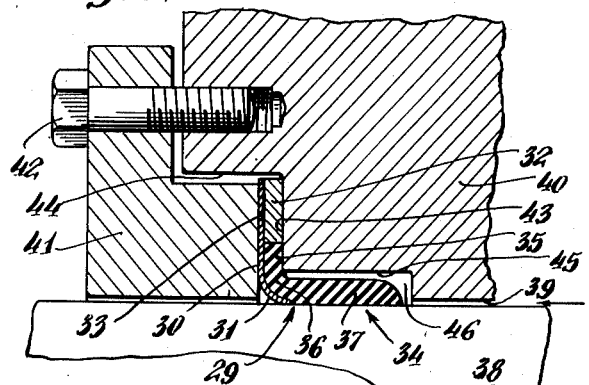
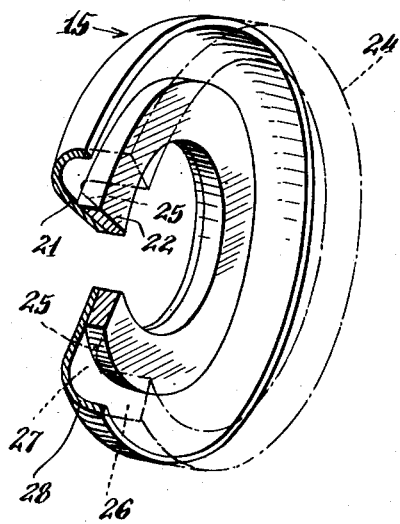
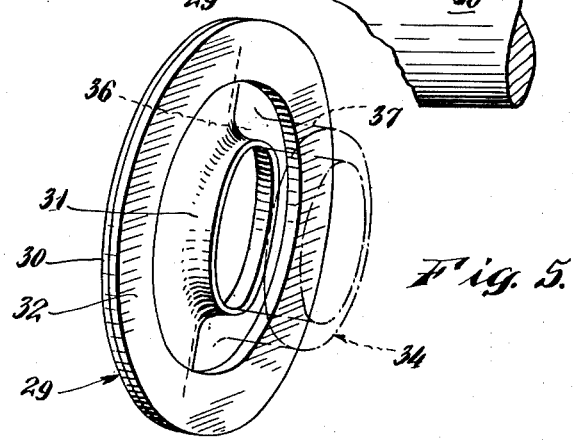
INVENTOR.
Edmund H. Smith
BY
Fraser, Myers & Manley
ATTORNEYS.

Patented Mar. 3, 1953

2,630,357

UNITED STATES PATENT OFFICE 2,630,357

PACKING ELEMENT WITH RIGID MOUNTING AND REINFORCING MEMBER

Edmund H. Smith, Palmyra, N. Y., assignor to The Garlock Packing Company, Palmyra, N. Y., a corporation of New York Application March 22, 1950, Serial No. 151,103

4 Claims. (Cl. 309—33)

This invention relates to improvements in packing elements, such as piston cups and packing rings, and more particularly is directed to improvements in reinforcing means for such elements and in mounting means by which such elements are fixedly associated with piston rods or with packing glands having reciprocating rods working therein.

As the principles upon which this invention are founded are substantially the same either with respect to pistons or with respect to packing rings for packing reciprocating rods, the objects of the present invention can best be generally understood by envisioning its use as applied to packing cups for pistons which are usually referred to as piston cups.

It has become more or less common practice to manufacture piston cups by molding them of relatively soft rubber-like material into the desired cup shape and also to mold such a piston cup to a rigid, annular, disc-like member, usually of metal, serving as a means for reinforcing the radially extending portion of the piston cup. Because of the fact that soft, rubber-like material of the cup is molded and bonded to the disc-like metal element, such bonded association of the two operates, to a slight extent, to minimize outward radial flow of the soft, rubber-like, radial portion or flange of the piston cup when it is installed on a piston and while it is in use. Even so, the mentioned outward radial flow may occur to a very objectionable extent when the piston cup is associated with the piston and if, as is true in many cases, the operating conditions of the piston are such as to soften the rubber-like material, the radial flow of the latter is greatly accentuated.

The mentioned radial flow, in prior structures, usually causes the soft, rubber-like material to congest at the juncture or heel between the radial portion or flange of the cup and a cylindrical sealing flange thereof. This congestion imposes excessive power demands to overcome the abnormally greater friction of the enlarged heel of the piston cup with the cylinder in which it is operating. Also, the mentioned radial flow, with resultant congestion at the heel, greatly increases the rapidity with which the piston cup may wear out at the heel and also to some extent increases the possibility of fracture of the cup at that point. Such harmful congestion at the heel may also result from the soft material in the cylindrical sealing flange of the cup being pushed toward the heel by the reaction of fluid pressure in the piston chamber, exerted axially upon the sealing flange.

Where a cup portion of soft, rubber-like material is bonded to a metal supporting disc as just mentioned it has been customary for the rubber-like material to overlie substantially the entire disc. In consequence, when such a piston cup is bolted or clamped between a piston head and a rigid washer or follower, it has been found that the bolts or other clamping means employed cannot be satisfactorily tightened and will loosen quickly in service. The mere clamping of the radial wall of the cup between a piston head and follower causes radially outward cold flow of the soft cup material so that it is difficult to tighten the bolts holding the cup in place. But even after tightening of the bolts, the cold flow continues and the flow is accentuated in service when the rubber-like material becomes softer or more pliant as the piston reciprocates. Not only does this flow after tightening of the bolts yield the mentioned undesirable congestion at the heel, but the bolts immediately loosen because of the lessened torque reaction of the rubber-like material with the bolts. The loosening of the bolts causes the cup to slap back and forth so that it breaks down very quickly.

Under any of the mentioned conditions, the piston cup is short lived and must be replaced frequently, involving expense not only for the actual replacement, but also resulting from the fact that the machine is out of service while such replacements are being effected.

An important object of the present invention is the provision of a reinforced, molded piston cup or packing ring of such character that the axial compression, which comes into play when the cup or ring is bolted or clamped into place, is effective only upon rigid parts of the cup so that the bolts or clamping means will not loosen, and harmful radial flow of the molded material is obviated, thereby avoiding congestion at the heel of the cup or ring.

Another important object of this invention is the provision of a reinforced, molded piston cup or packing ring in which the portion to be subjected to axial compression for holding it in place includes rigid material, preferably metal, throughout substantially its entire thickness so any of the molded material which may be included within the area of the axially compressed portion of the cup or ring is not subjected to any material degree of compression which could cause it to flow sufficiently to cause harmful congestion of the molded material at the heel of the cup or ring.

Another important object of this invention is the provision of a reinforced, molded piston cup or packing ring which includes a reinforcing member of metal or other rigid material, which is so shaped and related to a part formed of soft molded material that it prevents congestion at the heel of the cup or ring by guiding and controlling any flow of such molded material which may occur in the vicinity of the heel.

The foregoing and other objects are accomplished by the present invention of which two embodiments are shown for illustrative purposes in the drawings and described in the following specification, without, however, limiting the invention to those particular embodiments.

In the drawings:

Figure 1 is a central axial section of a piston including piston cups according to this invention, the various parts of the piston and the latter's mounting means being shown before being tightened.

Fig. 2 is a view similar to Fig. 1 in which, however, the parts are shown in their fully tightened condition.

Fig. 3 is a sectionalized perspective view of a piston cup such as is included in the structure illustrated in Figs. 1 and 2, rigid parts of the cup being shown in full lines and relatively soft, molded, rubber-like parts thereof being shown in dot and dash lines.

Fig. 4 is a central axial section at one circumferential point of a gland which includes a packing ring according to this invention, for packing a reciprocating rod.

Fig. 5 is a perspective view of the packing ring shown in Fig. 4, rigid parts of the ring being shown in full lines and relatively soft, molded rubber-like parts thereof being shown in dot and dash lines.

Referring to the first embodiment of this invention illustrated in Figs. 1, 2 and 3, there is shown a piston rod 11 having a reduced end portion 12 forming a shoulder 13 against which is disposed an annular follower plate 14 of metal, preferably of substantial thickness. Next to the follower plate 14 is a piston cup 15 of the character comprehended by the present invention, then an annular piston body 16 of slightly less diameter than the inner diameter of a cylinder 17 within which the piston is adapted to reciprocate. Next is another piston cup 15, then another follower plate 14; and the several follower plates, piston cups and the piston body are disposed coaxially between the shoulder 13 and a washer 18 which is held in place by a nut 19 screwed onto a threaded end portion 20 of the piston rod.

It may be noted that, in the arrangement illustrated in Fig. 1, the two piston cups are arranged so that their concavities face away from each other. The two piston cups 15 are similar. Such a cup consists of a rigid dish 21, preferably of suitable, rigid metal and centrally apertured to receive the end of the piston rod therewithin the concavity of the dish and bordering the latter's inner margin is a rigid washer 22, preferably of metal, welded as at 23 to integrate it with the dish 21. The remainder of the piston cup consists of an annular sealing member 24 of relatively soft, rubber or rubber-like material. The sealing member 24 has a radially, inwardly extending mounting flange 25 which, preferably, is slightly thicker than the washer 22 so that, to a very slight extent, it extends axially beyond the outer surface of that washer. The sealing member also has a cylindrical sealing flange 26 which, preferably, is of a normal over-all diameter somewhat greater than the inside diameter of the cylinder 17, so that, when the piston is inserted in and working in the cylinder, the flange 26 effects a firm sealing engagement therewith.

If desired, the sealing flange 26 may include suitable spring means (not shown) for urging it radially outwardly to enhance its sealing engagement with the cylinder wall. Also, as shown in the drawing, the inner side of the flange 26 is preferably spaced from the outer peripheral surface of the follower plate 14 so that any pressure developed in the cylinder at that side of the piston will tend to force the sealing flange radially outwardly and thus enhance its sealing engagement with the cylinder wall. The sealing member 24 also has a heel portion 27 serving to join the mounting flange 25 and the sealing flange 26. The rigid dish 21, preferably is flared arcuately at its outer periphery as at 28 to extend intimately around the heel portion 27 of the sealing member.

A piston cup as just described may be made by first cutting and forming the rigid dish 21 and the rigid washer 22 to their desired sizes and shaped and then welding them together. Then the integrated dish and washer are placed in a suitably designed mold with a blank of unvulcanized soft, rubber or rubber-like moldable material which, when vulcanized, will be suitable for its intended purpose; whereafter, the assembled parts, including said moldable material, are subjected to heat and pressure in the mold. This causes vulcanization and shaping of the moldable material into the sealing member 24 and causes the latter to be bonded within the rigid dish 21 and to the outer peripheral surface of the rigid washer 22.

In order to assure an effective bond of the sealing member to the dish and washer, the two latter parts may be suitably treated before being introduced into the mold, as for example, by the application of suitable bonding rubber or other adhesive material thereto. The mold in which the complete piston cup is molded and bonded is preferably so shaped as to give the mounting flange 25 its mentioned slightly greater normal thickness than the thickness of the washer 22.

If desired, the blank from which the sealing member 24 is to be derived may include fibrous material or one or more plies of fabric or other suitable pliant reinforcing material (not indicated in the drawing). Irrespective of whether such pliant, or fibrous or fabric reinforcing material is used, a cup or ring according to this invention is such that the soft, rubber-like sealing member is very adequately supported and safeguarded against premature rupturing or excessive wear.

The difference in thickness as between the radial mounting flange 25 of the sealing member and the washer 22 is somewhat exaggerated in the drawing. The mentioned difference in thicknesses, preferably, is sufficiently slight that when the nut 19 is tightened as in Fig. 2 the soft material of the radial flange 25 at one side of the outer margin of the adjacent follower plate 14 is compressed axially only to a slight extent and does not flow or tend to flow radially either inwardly or outwardly to any material extent. Thus, when the nut 19 is tightened, the axial compressive force, holding the several parts of the device in place, extends from the nut 19 through the washer 18, a follower plate 14, the rigid washer 22 and the rigid dish 21 of one of the piston cups, thence through the piston body 16, and through the rigid dish 21 and the rigid washer 22 of the other piston cup, and thence through the other follower plate 14 to the shoulder 13. As all the parts just enumerated are rigid, it may be seen that the piston and its related parts are locked together in complete axial rigidity so that once sufficient torque is applied to the nut 19 to tighten the parts to the desired extent, the axial compression thereof is maintained indefinitely; and this is true even if some flow, shrinkage, or other deformation of the soft sealing member were to occur during use of the device.

It should be noted that the arcuately flared portion 28 of the rigid dish 21 serves as a positive means for preventing any congestion of the soft rubber-like material at the latter's heel portion 27. As already explained, there is no material tendency of the radial flange 25 to flow outwardly, but if such flow were to occur under some unusual operating condition, it, nevertheless, would be controlled by the flared portion 28 so that, instead of the flow being directed to the wall of the cylinder 17, it would be diverted in an axial direction and be taken up in the sealing flange 26. On the other hand, if high pressure in the cylinder, applied against the free edge of the sealing flange 26, were to tend to cause that flange to congest at the heel, such congestion would be averted, for the flared portion 28 would divert the material in the sealing flange, to some extent, into the radial flange 25 and the latter would become somewhat compacted to take up the diverted material. Ordinarily, only a slight amount of material would thus be diverted under either of the conditions just recited, but such diversion would suffice to avoid harmful congestion at the heel.

Even if the described diversion were not sufficient to avoid congestion at the heel completely, nevertheless, the flared portion 28 of the rigid dish would function as a barrier to prevent the congestion from deforming the sealing element radially outwardly so that the only deformation of said element would extend radially inwardly. Thus, it could not cause the sealing element to press too tightly against the cylinder wall so that no excessive wear or breakdown of the sealing element would occur.

The principles and concepts hereinbefore set forth with reference to piston cups may also be embodied in a packing ring adapted to be installed within a bore in a machine casing and to effect a sliding seal with a rod reciprocating within the bore. From the illustration of such a packing ring arrangement in Figs. 4 and 5 it may be seen that a packing ring 29 consists of a rigid annular disc 30, preferably of metal, flared arcuately at its inner peripheral margin as at 31, a rigid washer 32, preferably of metal, welded as at 33 to the outer peripheral margin of the disc at the flared side of the latter, and a relatively soft, molded rubber or rubber-like sealing member 34 which is generally L-shaped in cross-section and is molded and bonded to the said disc and washer. The sealing member 34 has a radial flange 35 which abuts the inner periphery of the washer 32 and is disposed against an adjacent annular flat portion of the disc 30, a heel 36 which extends about the flared portion 31 within the curvature of the latter, and a cylindrical sealing flange 37.

The sealing flange 37 effects a sliding seal with a rod 38 which reciprocates within an opening 39 in a machine casing 40. A gland follower 41, held and tightened by bolts 42 (only one being shown in the drawing) threaded into the machine casing, clamps the radially extending portions of the packing ring between the gland follower and a flat, annular bottom surface 43 of a primary annular recess 44, and the sealing flange 37 extends freely into an annular counter-recess 45 with some clearance as at 46 about the latter flange. This clearance enables the contained fluid pressure, effective from within the machine casing and along the rod in the direction of the arrow in Fig. 4, to exert its force radially inwardly upon the sealing flange to enhance the latter's sealing engagement with the rod 38.

Preferably, the radial flange 35 of the sealing member normally is slightly thicker than the washer 32 similarly and with the same results as hereinbefore described with reference to the radial flange 25 in the first described embodiment of Figs. 1, 2 and 3. Also, the rigid, integrated disc 30 and washer 32 are locked in complete axial rigidity between the gland follower 41 and the recess bottom 43, similarly and with the same results as hereinbefore described with reference to the dish 21 and washer 22 of the first embodiment.

The presently disclosed and described embodiments of this invention very effectively achieve the stated objects and it should be apparent that the concepts set forth herein may be practiced in various other embodiments without departing from the present invention.

What I claim is:

1. A packing element comprising a rigid, annular, metal, reinforcing member having an annular heel portion of arcuate cross-section at one side thereof and at one of its peripheries, an annular mounting portion at its other periphery and a flat, annular, backing web integrally and rigidly interconnecting said heel and mounting portions; the said mounting portion having an annular, plane surface, at the said one side of the reinforcing member and in stepped relation to the corresponding side face of said web, which plane surface is of substantial width radially and constitutes a relatively broad pressure-receiving surface, and said mounting portion, further, having a cylindrical surface extending from said pressure-receiving surface to said corresponding side face of the web; and the packing element further comprising an annular sealing member of relatively soft, flexible, packing material, having a flat portion intimately associated with said one side of the reinforcing member and in abutment with said cylindrical surface, a generally cylindrical sealing flange for effecting a sliding seal with an adjacent cylindrical surface in a machine structure, and an annular heel portion joining said flange to said flat portion and disposed within the heel portion of the reinforcing member; the outer radial surface of said flat portion, when the latter is subject to axial pressure, being in approximately the same plane as said plane surface of the mentioned mounting portion, whereby to enable the latter to assume substantially the entire axial force applied thereto in holding the packing element mounted in place in a machine structure.

2. A packing element according to claim 1, wherein the said mounting portion of the metal reinforcing member comprises a flat, annular, metal washer fixedly associated with said reinforcing member; the said washer having a plane, pressure-receiving surface which is materially greater in radial dimension than the thickness of the reinforcing member's web.

3. A packing element according to claim 1, wherein the said packing element is a piston cup, the heel portion of the reinforcing member is at the latter's outer periphery and the mounting portion of said reinforcing member is at the latter's inner periphery.

4. A packing element according to claim 1, wherein the said heel portion of the reinforcing member is at the latter's inner periphery and the mounting portion of said reinforcing member is at the latter's outer periphery.

EDMUND H. SMITH.

REFERENCES CITED

The following references are of record in the file of this patent:

UNITED STATES PATENTS

| Number | Name | Date |
|---|---|---|
| 1,212,294 | Walker | Jan. 16, 1917 |
| 1,215,445 | Waller | Feb. 13, 1917 |
| 1,845,939 | Sowden | Feb. 16, 1932 |
| 1,945,524 | Foehr | Feb. 6, 1934 |
| 2,116,240 | Heinze | May 3, 1938 |
| 2,145,928 | Heinze et al. | Feb. 7, 1939 |
| 2,264,741 | Chamberlain | Dec. 2, 1941 |
| 2,415,888 | Joy | Feb. 18, 1947 |

FOREIGN PATENTS

| Number | Country | Date |
|---|---|---|
| 479,743 | Great Britain | of 1938 |
| 560,515 | Great Britain | of 1944 |